Patented May 8, 1951

2,551,705

UNITED STATES PATENT OFFICE 2,551,705

HERBICIDES

Raymond A. Rogers, Wilmington, Calif., assignor to Union Oil Company of California, Los Angeles, Calif., a corporation of California No Drawing. Application March 5, 1945, Serial No. 581,173

7 Claims. (Cl. 71—2.4)

This invention relates to a composition suitable for application to the soil or to plants to act as a herbicide.

It is desirable in many instances to prevent all growth of plant life on certain areas of soil such as along railroad tracks or highways. This is particularly important around oil wells, where fires resulting from accidental combustion of dry weeds would have very disastrous results. Many weed killers have been proposed in the prior art, among the most effective of which have been the metal chlorates or arsenic compounds. These are generally applied as water solutions which may also contain small amounts of various acids, alkalis, or salts. Certain oils such as hydroformed or cracked gasolines have also been proposed. It has been found however that although each of the above weed killers is effective to a certain extent, they are dangerous to employ in high concentrations, since the arsenic compounds are notably toxic to animals and human beings, and the chlorates and the gasolines present real fire hazards; and if they are employed in concentrations which are sufficiently low to reduce these hazards materially, their effectiveness is generally limited to a period of a very few weeks, so that it becomes necessary to apply them very frequently in order to maintain the area free from dangerous weed growth.

It has now been discovered that there is a combination of two or more ingredients which presents relatively little danger from a toxicity or fire standpoint, and which is effective not only in giving an immediate kill of weed growth already present but in sterilizing the soil so that weed growth does not appear again for a matter of months. The composition of this invention comprises essentially an oil and a boron compound, and is preferably in the form of an emulsion of the oil and an aqueous solution of an alkali borate, such as sodium metaborate. The oil is preferably a mineral oil fraction boiling above the gasoline range and containing a major proportion of unsaturatd and aromatic type hydrocarbons. It may be a selective solvent extract or a cracked petroleum fraction or a fraction from shale oil, coal tar or the like as described more fully below. The concentration of the boron compound in the aqueous solution should be high such as greater than about 6% and preferably greater than about 10% by weight and up to the saturation point. The aqueous solution may also contain relatively small amounts of other materials of toxic nature such as metal chlorates or arsenic compounds but preferably do not contain such compounds except perhaps in very small quantities such as about 0.1% to 2% for the chlorates and about 0.01% to 0.2% for the arsenic compounds. Other materials such as insoluble or oil-soluble toxic agents or emulsifiers may also be included in the composition if desired.

As a specific example of the invention, the following composition was prepared and used as indicated. The oil used was an extract fraction obtained by treating a kerosene distillate from a California crude oil with about an equal volume of liquid sulfur dioxide at a temperature of about 10° to 15° F. in a countercurrent extraction apparatus of the conventional Edeleanu plant type, removing the sulfur dioxide from the extract phase, and fractionally distilling the extract to remove substantially all of the materials boiling below about 450° F. The resulting "kerosene extract bottoms" fraction had a boiling range between about 450° F. and 550° F., and contained about 70% to 80% of aromatic type hydrocarbons. An aqueous solution was prepared by dissolving commercial borax in caustic soda solution, using the borax and caustic soda in proportions equivalent to about one mol of borax ($Na_2B_4O_7.10H_2O$) to one mol of sodium oxide ($Na_2O$). A small amount of potassium chlorate was also dissolved. The resulting solution contained about 13.4% by weight of sodium metaborate and 1.5% of potassium chlorate. It was substantially neutral, and had a density of 1.19 at 78° F. Twenty gallons of the above kerosene extract bottoms and ten gallons of the above aqueous solution were mixed to form an emulsion, and this was sprayed uniformly in a fine spray over a 170 sq. yard plot of a weed patch located in the Richfield oil field, which is located about five miles east of Fullerton, California. This weed plot was one of a large number of similar plots in the same area used for purposes of comparing the effectiveness of various weed killers, and at the time of spraying on November 20, 1944, there was a slight but dense weed growth which was about 1 to 2 inches high covering the entire area. These weeds were miscellaneous in type such as Bermuda grass, foxtail, malva, sour dock, sweet anise, wild oat and the like. An immediate and complete kill of all of these young weeds on the plot sprayed resulted. Furthermore, no new growth started for a long time. Nearly eleven weeks later, on February 3, 1945, the only living plant on the entire plot was a single sour dock. On February 17, 1945, a slight general growth of Bermuda grass and other weeds was just beginning to show and it was estimated that the growth would not reach a size dangerous enough to require further application of spray for about another month, which would be a total of about four months from the initial spraying.

The unexpected effectiveness of the above combination is evidenced by data obtained during the same period on surrounding plots, which were similarly sprayed with either the oil alone or with the aqueous solution alone. In both of the latter instances there was an immediate kill of substantially all of the plants on the plot but new growth was well started within two to three weeks and reached dangerous proportions requiring respraying within about a month. As examples of these tests a plot of 110 sq. yards in the same general area was sprayed with 17 gallons of the above kerosene extract bottoms alone on December 13, 1944. There was immediate substantially complete kill of all weeds on the plot, but new growth started within about two weeks and in about a month the growth was sufficiently heavy to necessitate respraying. Similarly a plot having an area of 140 sq. yards was sprayed on November 20, 1944, with twenty gallons of the same aqueous solution used in the above example, and although the kill was immediate and complete, new growth started within about two weeks, and within about five weeks the growth was so heavy as to require respraying. Regions in the same area which were entirely unsprayed developed a healthy growth of weeds averaging 12 to 14 inches in height within a period of about three months.

It has also been found that oils of even lower volatility than the kerosene bottoms of the above examples are also effective ingredients of the weed killers of this invention. Cracked stocks and extract stocks of these lower volatility ranges are especially effective. An extract obtained in the preparation of spray oils is unusually effective in that it has a substantial killing power of its own (although it is inferior in this respect to the emulsions of this invention) and it also has an emulsifying action which makes the emulsions of this invention very easy to prepare and very stable. As an example, a blend containing one part by volume of spray oil extract and three parts by volume of kerosene extract bottoms, emulsified with two parts by volume of the aqueous solution used in the specific example above is an excellent preparation. The spray oil extract is obtained by selective solvent extraction of a fraction from a California crude oil boiling above the kerosene range and in the range of about 550° to 750° F., using liquid sulfur dioxide and obtaining about 50% to 60% of a raffinate fraction which is suitable for spraying of orchards for pest control, and about 40% to 50% of an extract fraction which though normally considered a waste product, is of exceptional value for the purposes of this invention. Other desirable extracts are produced by treatment of oils such as Diesel fuels, lubricating oils and the like with selective solvents such as sulfur dioxide, phenol, furfural and the like at temperatures between about 0° F. or lower for the lighter oils or temperatures up to 200° F. or more for the heavier oils. Suitable extracts may be obtained in yields of about 20% or less to about 50% or more of the oil treated. The lower boiling extracts result in a very quick kill of existing weeds whereas the heavier fractions appear to require a somewhat longer time for a complete kill of existing plants but their effectiveness is somewhat more prolonged.

The above extracts have about the same boiling ranges as the stocks treated but have a much higher content of aromatic hydrocarbons. They also contain a few per cent of unsaturated hydrocarbons, and small amounts of non-hydrocarbons such as sulfur-, nitrogen-, and oxygen-containing compounds, notably naphthenic acids and phenols. Cracked fractions such as cycle stock or cracked gas oils produced in the thermal or catalytic cracking of petroleum fractions may also contain major proportions of aromatic and unsaturated type hydrocarbons, as well as small amounts of non-hydrocarbons as above, and are excellent oils for the purposes of this invention. As with the extracts above, the higher-boiling stocks are safer and more effective.

Although extracts and cracked fractions as described above are preferred, since they have some toxic effects of their own and usually have better emulsification characteristics, it has been found that even straight-run fractions such as kerosene, fuel oils, gas oils, lubricating oil distillates, crude oils, and the like, are effective if used in the emulsions of this invention. For example, crude oils which by themselves have substantially no effect on the weeds, may be blended with the extracts and the like, or even used without blending, in the emulsions of this invention, and the products are markedly more effective than either the component oil or aqueous solution used separately.

It is desirable that the oil fraction used in the emulsions of this invention contain at least 10% of relatively heavy oils boiling above about 500° F. and preferably boiling above about 700° F. The proportion of these heavy oils may be as high as 100%, although very high proportions of very heavy oils may increase spraying difficulties, due to formation of very viscous emulsions. Proportions between about 25% and 65% are generally preferable.

In the water solutions of the emulsions of this invention as indicated above the concentration of the boron compound is preferably high, such as above 6% or preferably above 10% by weight. Lower concentrations may be employed, but are less desirable because they emulsify less readily and require heavier application. Sodium metaborate is the preferred salt but any other soluble boron compund such as the potassium or ammonium metaborates, or the ammonium, sodium, potassium or other alkali metal metaborates, tetraborates and the like may be used. These compounds of the alkali metals and ammonium will be referred to herein as the "alkali borates." The solutions are preferably approximately neutral although alkaline solutions may also be employed in many instances and these are generally more readily emulsified. As stated above it is preferable that no arsenic compounds be employed nor any chlorates because of the hazards involved in their use. The more concentrated solutions of the alkali borates are also preferable in that they usually form less viscous emulsions than do the more dilute solutions. If desired, small amounts of emulsifying agents such as tall oil, soaps, sulfonates, sulfated alcohols and the like may be employed. Small amounts of other toxic agents such as phenols or naphthenic acids or their salts may also be employed together with the alkali borates. If these are used as salts they may be dissolved in the water solution or if used as acids they may be dissolved in oil.

The relative amounts of oil and aqueous solution to be employed in the emulsions of this invention may vary widely. Emulsions containing between about 25% and 90% of oil may be employed, but it is better to employ emulsions containing a major proportion of oil, preferably between about 65% and 90%. In these emulsions the oil is preferably the continuous phase. It is desirable to employ sufficient of each component of the emulsion to supply a treatment of at least about 50 gallons per acre of soil and at least about 50 pounds per acre of the alkali borate. Treatments with greater than 250 gallons of oil and 150 pounds of alkali borate per acre are preferred. In the specific example above, the amounts used were about 570 gallons per acre of kerosene extract bottoms, and about 330 pounds per acre of alkali borate.

In the application of the emulsion it is desirable that the emulsion be applied at the beginning of the weed growing season of the year before the weeds have developed in height more than an inch or two above the surface of the ground. The herbicides of this invention are equally effective on larger weeds but the mass of dead weeds resulting from the treatment of the larger weeds presents a fire hazard. If the treatment is applied at the beginning of the growing season as indicated above it may be necessary to treat again during the growing season once or perhaps twice. This will ordinarily suffice for the first year of the treatment. It will be found that treatment in subsequent years will become easier in that less frequent application and less heavy application at each treatment will be necessary to eliminate the weed hazard entirely.

It has also been found possible to employ the alkali borates undissolved or only partially dissolved in the emulsion. Thus a suspension may be made comprising an extract or other oil as described above together with water or an aqueous solution containing a small amount of a toxic agent together with an alkali borate such as borax which is finely ground and merely suspended in the emulsion or in one of its components. In general, however, the solutions are preferred to the suspensions.

It has also been found that the two phases of the emulsions of this invention may be applied separately rather than as an emulsion. Thus an aqueous solution of an alkali borate such as described above, may be applied to the plants and soil, and immediately thereafter, while the plants and soil are still wet, the oils of this invention may be applied to the same area. The two phases may be applied in the reverse order also, although the preferable order is aqueous phase first, then oil phase. Simultaneous application without emulsification may also be employed.

Other modifications of this invention which would occur to one skilled in the art are to be included in the scope of the invention as defined in the following claims.

I claim:
1. A herbicidal emulsion comprising a mineral oil consisting predominantly of unsaturated and aromatic type hydrocarbons, an aqueous phase, and an alkali borate.
2. An emulsion according to claim 1 in which the borate is dissolved in the aqueous phase.
3. A herbicidal emulsion comprising an aqueous solution of an alkali borate, and an oil consisting predominantly of unsaturated and aromatic type hydrocarbons boiling above about 400° F.
4. A herbicidal emulsion according to claim 3 in which at least about 10% of the oil boils above about 700° F.
5. A herbicidal emulsion comprising a substantially neutral aqueous solution of sodium metaborate, and an oil consisting predominantly of aromatic type hydrocarbons and boiling between about 450° F. and about 750° F.
6. A herbicidal emulsion comprising between about 10% and 35% by volume of a substantially neutral aqueous solution containing more than about 10% by weight of sodium metaborate, and between about 65% and 90% by volume of an oil consisting predominantly of aromatic type hydrocarbons and boiling between about 450° F. and about 750° F.
7. A herbicidal composition comprising a mineral oil consisting predominantly of unsaturated and aromatic type hydrocarbons and an aqueous phase containing an alkali borate.

RAYMOND A. ROGERS.

REFERENCES CITED

The following references are of record in the file of this patent:

UNITED STATES PATENTS

| Number | Name | Date |
|---|---|---|
| 669,725 | Eisch et al. | Mar. 12, 1901 |
| 1,707,465 | Volck | Apr. 2, 1929 |
| 2,079,827 | Volck | May 11, 1937 |
| 2,160,929 | Warner et al. | June 6, 1939 |
| 2,166,500 | Lyman | July 18, 1939 |
| 2,173,236 | Offord | Sept. 19, 1939 |
| 2,206,470 | Tanner et al. | July 2, 1940 |
| 2,414,640 | Fischer | Jan. 21, 1947 |

FOREIGN PATENTS

| Number | Country | Date |
|---|---|---|
| 10,450 | Great Britain | of 1905 |
| 228,805 | Great Britain | Feb. 12, 1925 |
| 647,104 | France | Nov. 20, 1938 |

OTHER REFERENCES

"The Science of Petroleum," Dunstan et al. (1938), vol. 2, p. 987.